March 6, 1928.                                                                1,661,839
G. MACLOSKIE
FLUID PRESSURE BRAKE
Filed July 26, 1926
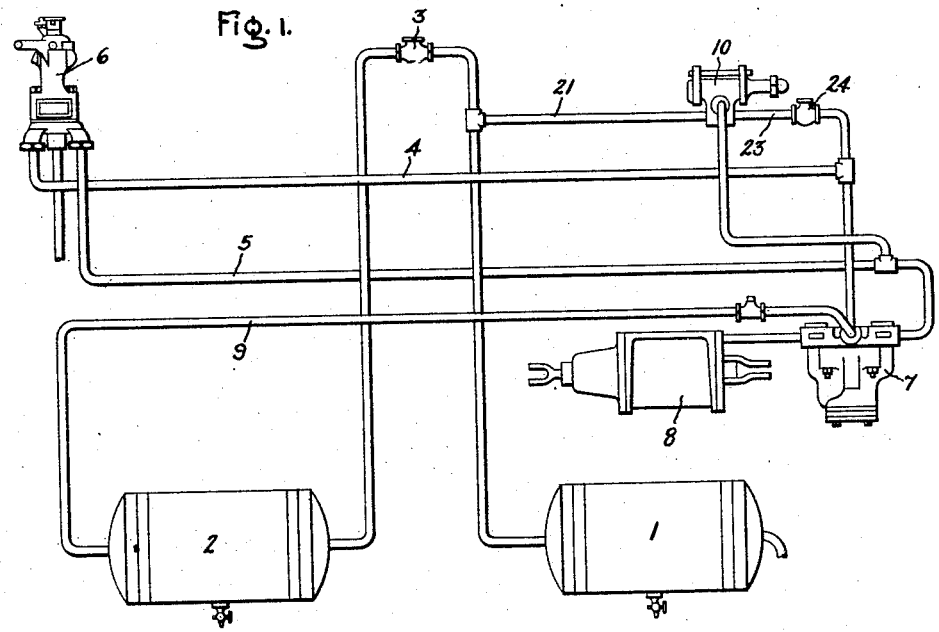
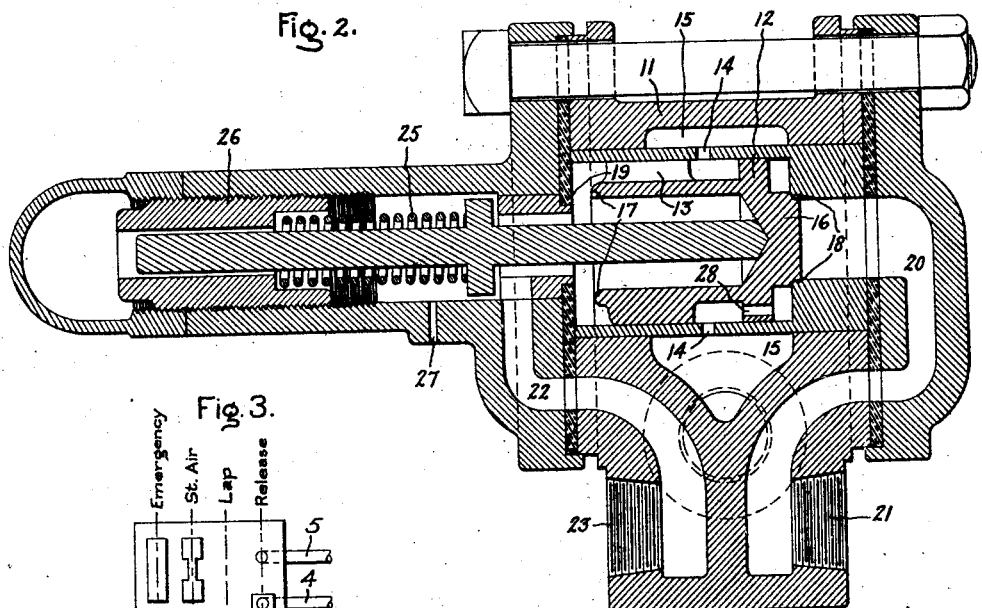
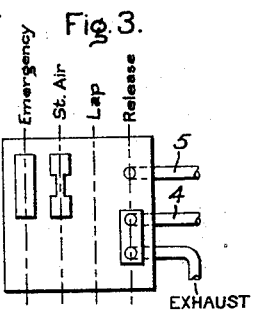
Inventor:
George Macloskie;
by　Alexander S. ____
His Attorney.

Patented Mar. 6, 1928.

1,661,839

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

FLUID-PRESSURE BRAKE.

Application filed July 26, 1926. Serial No. 124,849.

My invention relates to fluid pressure brakes and more particularly to a fluid pressure brake system in which fluid under pressure for controlling the brakes is supplied from a main reservoir.

If the compressor motor or the governor therefor should become inoperative or the main reservoir pipe should break or leak, the pressure in the main reservoir may be reduced to such an extent that the brakes cannot be applied, and this may occur without the operator becoming aware of the fact until he attempts to apply the brakes.

An object of my invention is to provide an improved arrangement for automatically effecting the application of the brakes upon a predetermined reduction in pressure in the main reservoir.

My invention will be better understood from the following description, taken in connection with the accompanying drawing, and its scope will be pointed out in the appended claims.

In the accompanying drawing, Fig. 1 is a diagrammatic view of a straight air brake equipment with emergency feature embodying my invention; Fig. 2 is a sectional view of the protection valve which is shown diagrammatically in Fig. 1, and Fig. 3 is a diagrammatic development of a motorman's brake valve that may be used in the system shown in Fig. 1.

The straight air brake equipment with emergency feature shown in Fig. 1 comprises the usual main reservoirs 1 and 2, which are connected together through a check valve 3 which allows fluid pressure to flow only from reservoir 1 to reservoir 2, a straight air pipe 4, an emergency brake pipe 5, a brake valve 6, an emergency valve 7 and a brake cylinder 8.

The emergency valve 7 may be of any suitable type, examples of which are well known in the art, whereby communication is established between the straight are pipe 4 and the brake cylinder 8 when the fluid pressures in the emergency brake pipe 5 and the main reservoir pipes 9 are substantially equal, and communication is established between the main reservoir pipe 9 which is connected to reservoir 2 and the brake cylinder 8, and a restricted communication is established between the main reservoir 2 and the emergency pipe 5 when the fluid pressure in the emergency pipe 5 is less than the pressure in the main reservoir pipe 9 by a predetermined amount.

The brake valve 6 may be of any suitable construction, examples of which are well known in the art. Fig. 3 is a diagrammatic development of a brake valve that may be used and clearly shows the various connections that are made by the valve when it is placed in its various operating positions.

10 represents a protection valve which is arranged to effect an emergency application of the brakes in case the pressure in the reservoir 1, for any reason, falls below a predetermined value.

The protection valve 10, a preferred construction of which is shown in Fig. 2, comprises a body portion 11 containing a piston 12 slidably mounted in a piston chamber 13. The portion of the piston chamber 13 to the left of the piston 12 is connected by suitable ports 14 to a passage 15 which is connected to the emergency pipe 5. Valve 16 projects from one face of the piston and is on the valve seat 18 when the piston is in the position shown. Another valve 17 projects from the other face of the piston and is arranged to be moved onto the valve seat 19 when the piston is moved to the left. The valve 16 controls a connection between a passage 20 which is connected to pipe 21 leading to the main reservoir 1 and the portion of the piston chamber 13 to the right of the piston 12. It will be observed that when the valve 16 is on the valve seat 18 the fluid pressure in the passage 20 is applied to a smaller area of the piston than when the valve is off of its seat. Therefore, it takes a greater pressure in the passage 20 to open the valve than to maintain the valve open.

The valve 17 controls a connection between the portion of the piston chamber to the left of the piston and a passage 22 leading to a pipe 23 which is connected to the straight air pipe 4 through a suitable check valve 24. The valve 24 is arranged so it permits fluid pressure to flow only from pipe 23 to pipe 4.

The movement of the piston 12 by the pressure in the passage 20 is opposed by a suitable spring 25, the restraining force of which may be varied by suitable means shown as an adjusting screw 26. 27 is a small leak port which connects the passage 22 to atmosphere. The purpose of this port is to take care of any leakage that may occur around the valve 17 when it is on its seat 19.

28 is a small port through the piston 12, which connects both portions of the piston chamber 13 together. When the piston is moved to the left so that the valve 16 is open, this port establishes communication between the main reservoir 1 and the emergency pipe 5. Therefore, this port provides a means for recharging the emergency line after an emergency application of the brakes has been made.

The operation of the system shown is as follows: When the compressor, not shown, is first started to build up the pressure in the main reservoirs 1 and 2, the motorman's valve 6 is placed in the lap position, in which position the straight air pipe 4 and the emergency pipe 5 are blanked. The protection valve 10 is in the position shown in the drawing. Under these conditions, the emergency valve 7 is in its normal position, and therefore the main reservoir pressure and the pressure in the emergency pipe build up to their normal values. Emergency pipe pressure exists in the straight air pipe 4 and the brake cylinder 8 because the emergency and straight air pipes are connected together through valve 17 of the protection valve 10. The piston 12 of the protection valve remains in the position shown because the pressures on both sides thereof are substantially equal. Under these conditions, a small amount of air escapes to atmosphere through the leak port 27, but the opening therethrough is so small that it does not prevent the pressure from building up.

When sufficient pressure has been built up in the main reservoir, the motorman's brake valve 6 is moved to the release position, in which position the straight air pipe is connected directly to atmosphere. Consequently, the pressure on the left hand side of the piston is decreased, whereas the pressure on the right hand side does not change. Therefore, the piston is moved toward the left, thereby closing valve 17 and opening valve 16. The closing of valve 17 cuts off communication between the emergency pipe 5 and the straight air pipe 4. The opening of valve 16 establishes communication between the main reservoir pipe 21 and the emergency pipe 5 through the port 28 in the piston 12, so that the emergency pipe can be recharged after an emergency application of the brakes has been made.

So long as the pressure in the main reservoir 1 remains above a predetermined value, which is determined by the setting of the spring 25, the valve 17 of the protection valve remains closed. When a straight air application of the brakes is made, the check valve 24 prevents fluid pressure from flowing from the straight air pipe to the left side of the piston 12. Consequently, the pressures on the opposite sides of the piston 12 are not equalized and the spring 25 does move the piston 12 to the position shown in the drawing each time a straight air application of the brakes is made.

In case the pressure in the reservoir 1, for any reason whatever, decreases below the setting of the protection valve 10, the spring 25 moves the piston 12 toward the right so that valve 17 is opened and communication is established from the emergency pipe 5 to the straight air pipe 4. Therefore, if the brake valve is in either the release position or in the lap position with substantially no fluid pressure in the brake cylinder when the valve 17 is opened, sufficient fluid pressure is vented from the emergency pipe to the straight air pipe to cause the emergency valve to effect an emergency application of the brakes in a manner well known in the art.

The valve 17 may be reclosed in the manner above described, as soon as the main reservoir pressure has been restored to a predetermined value.

While I have in accordance with the patent statutes shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In a fluid pressure brake system, a main reservoir, an emergency pipe, a straight air pipe, an emergency valve, and means subjected to the fluid pressure in said main reservoir for venting fluid from said emergency pipe to said straight air pipe to effect the operation of said emergency valve when the pressure in said reservoir decreases below a predetermined value.

2. In a fluid pressure brake system, a main reservoir, an emergency pipe, a straight air pipe, an emergency valve, means subjected to the fluid pressure in said main reservoir for establishing a connection between said emergency and straight air pipe when the pressure in the main reservoir decreases below a predetermined value, and means in said connection for permitting fluid to flow only from said emergency pipe to said straight air pipe.

3. In a fluid pressure brake system, a main reservoir, an emergency pipe, a straight air pipe, an emergency valve, and a valve device for controlling a connection between said emergency pipe and said straight air pipe comprising a piston for actuating said device to establish said connection when the pressure in said reservoir decreases below a predetermined value, one side of said piston being subject to the pressure in said main reservoir, and means for exerting a force on said piston in opposition to the force exerted by the pressure in said reservoir.

4. In a fluid pressure brake system, a main reservoir, an emergency pipe, a straight air pipe, an emergency valve, and a valve device for controlling a connection between said emergency pipe and said straight air pipe comprising a piston for actuating said device to establish said connection when the pressure in said reservoir decreases below a predetermined value, said piston having one side subject to the pressure in said reservoir and the other side subject to the pressure in the emergency pipe, and a spring for opposing the force exerted on said piston by the pressure in said reservoir.

5. In a fluid pressure brake system, a main reservoir, an emergency pipe, a straight air pipe, an emergency valve, and a valve device for controlling a connection between said emergency pipe and said straight air pipe comprising a piston for actuating said device to establish said connection when the pressure in said reservoir decreases below a predetermined value, said piston having one side subject to the pressure in said reservoir and the other side subject to the pressure in the emergency pipe, a spring for opposing the force exerted on said piston by the pressure in said reservoir, a check valve in said connection between said valve device and the straight air pipe, and a restricted connection to atmosphere in the connection between said valve device and said check valve.

6. In a fluid pressure brake system, a main reservoir, an emergency pipe, a straight air pipe, an emergency valve, and a valve device for controlling a connection between said emergency pipe and said straight air pipe comprising a piston for actuating said device to establish said connection when the pressure in said reservoir decreases below a predetermined value, said piston having one side subject to the pressure in said reservoir and the other side subject to the pressure in the emergency pipe, a port through said piston, and a valve controlled by said piston for establishing communication between said main reservoir and the emergency pipe through said port when said valve device is in a position to cut off communication between said emergency and straight air pipes.

In witness whereof, I have hereunto set my hand this 23rd day of July 1926.

GEORGE MACLOSKIE.